US012724864B2

(12) United States Patent
Singh et al.

(10) Patent No.: US 12,724,864 B2
(45) Date of Patent: Sep. 1, 2026

(54) REMOTE SECURE BOOT VERIFICATION SERVICE FOR SECURE DEPLOYMENT OF VIRTUAL MACHINES

(71) Applicant: Dell Products L.P., Round Rock, TX (US)

(72) Inventors: Ankit Singh, Bangalore (IN); Shrikant U. Hallur, Bangalore (IN); Naveen Awasthy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/637,527

(22) Filed: Apr. 17, 2024

(65) Prior Publication Data

US 2025/0328621 A1 Oct. 23, 2025

(51) Int. Cl.

*G06F 21/00* (2013.01)
*G06F 21/33* (2013.01)
*G06F 21/55* (2013.01)
*G06F 21/57* (2013.01)
*G06F 21/64* (2013.01)

(52) U.S. Cl.

CPC ............ *G06F 21/33* (2013.01); *G06F 21/554* (2013.01); *G06F 21/575* (2013.01); *G06F 21/64* (2013.01)

(58) Field of Classification Search

CPC ...... G06F 21/33; G06F 21/554; G06F 21/575; G06F 21/64

See application file for complete search history.

(56) References Cited

U.S. PATENT DOCUMENTS

| | | | | |
|---|---|---|---|---|
| 8,949,825 | B1 * | 2/2015 | Fitzgerald | G06F 9/45537 718/1 |
| 10,528,736 | B1 * | 1/2020 | Sobel | G06F 12/1433 |
| 2012/0054744 | A1 * | 3/2012 | Singh | G06F 21/6218 718/1 |
| 2013/0061293 | A1 * | 3/2013 | Mao | G06F 21/53 726/4 |
| 2016/0274933 | A1 * | 9/2016 | Paolino | H04L 41/40 |
| 2018/0268146 | A1 * | 9/2018 | Suryanarayana | G06F 21/445 |
| 2019/0012271 | A1 * | 1/2019 | Avoinne | G06F 12/145 |
| 2020/0213112 | A1 * | 7/2020 | Singleton, IV | G06F 8/61 |

* cited by examiner

*Primary Examiner* — Ghazal B Shehni

(74) *Attorney, Agent, or Firm* — Jackson Walker L.L.P.

(57) ABSTRACT

Disclosed systems and methods for authenticating virtual machines, upon detecting a virtual machine launch (VML) request associated with a hypervisor and an unconfirmed VM, request a VM signing (VMS) certificate from a deployment/verification cloud server. The VMS certificate is forwarded to a certificate store of the hypervisor. After an unconfirmed VM is successfully authenticated, the VMS certificate may be deleted from the hypervisor certificate store. If an alert indicating a failed authentication associated is detected, termination operations are performed to prevent the unconfirmed VM from running under the hypervisor. The termination operations may include identifying a suspect key or signature associated with the unconfirmed VM and recording the suspect key or signature in a prohibited database store, such as a UEFI Secure Boot DBX variable store. For example, a suspect key or signature may be a key used to sign the unconfirmed VM.

13 Claims, 2 Drawing Sheets

REMOTE SECURE BOOT VERIFICATION SERVICE FOR SECURE DEPLOYMENT OF VIRTUAL MACHINES

TECHNICAL FIELD

The present disclosure pertains to information handling system virtualization and security and, more specifically, secure deployment of virtual machines (VMs).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include firmware to support low-level functions of a platform's specific hardware and to expose abstracted resources to higher level software including operating system (OS) software. The widely implemented Universal Extensible Firmware Interface (UEFI) specification defines an industry standard firmware architecture. The UEFI specification defines a Secure Boot protocol for securing the boot process by prohibiting the loading of UEFI drivers and OS boot loaders not signed with an acceptable digital signature.

Secure Boot for VMs now leverages the capabilities of the UEFI firmware to ensure that a hypervisor not only boots with a signed bootloader validated by the host firmware but, in addition, prevents the hypervisor from executing unsigned code. Existing VMs may be secured by a VM's Digital Certificate, which may be provided by the hypervisor, and UEFI Firmware Digital Certificates provided by a UEFI authenticated variable store.

Unfortunately, however, there is no continuous chain-of-trust in which, for example, the hypervisor boots from UEFI certificates and VMs boot from the hypervisor's certificates. A malicious user who gains access to system/hardware can easily edit, add, remove, and/or disable Secure Boot and its certificate(s) to launch its own malicious VM, causing potentially enormous disruption, loss of data, etc. not only to the system itself but also to the cloud infrastructure. Hypercall based denial of service (DOS) attacks, as an example, are rapidly becoming a serious threat to virtualized infrastructure. Attackers have developed new approaches to achieving DoS conditions in clouds. These modified DoS attacks may no longer be network packet-based and, instead, attacks may be conducted over the hyper-call interface. With attack packets, malicious hyper-calls can be loaded with parameters that are out of bounds or are otherwise unexpected. Such hyper-calls may focus on exhausting the hypervisor's share of CPU and memory resources.

SUMMARY

The security issues described above are addressed with remote verification services disclosed herein, which block any unauthorized VM launch or initialization not approved by an IT administrator. Disclosed features may realize these objectives by authenticating each new VM launch/initialization through Secure Boot certificates stored in authenticated variable storage of a VM Deployment/Verification Cloud Service as further described in the Detailed Description below.

Disclosed features detect and prevent addition and launching of unauthorized VMs to infrastructure through remote secure boot authentication. VM Certificates may be stored onto a database (DB) store of a VM Deploy/Verification Cloud Service, where they may be fetched as and when required. In the case of a tenant based VM infrastructure, a VM certificate in the DB store of VM Deploy/Verification Cloud Service will be signed by a key exchange key (KEK) of the same tenant. An original equipment manufacturer (OEM) Certificate Checker engine in the hypervisor will fetch the certificate and pass on the Digital Certificate for verification.

In one aspect, disclosed systems and methods for authenticating virtual machines, upon detecting a virtual machine launch request associated with a hypervisor and a new or otherwise unfamiliar VM, referred to herein as an unconfirmed VM, may request a VM signing (VMS) certificate from a deployment/verification cloud server. Responsive to receiving the VMS certificate, the VMS certificate is forwarded to a certificate store of the hypervisor. After an unconfirmed VM is successfully authenticated, the VMS certificate may be deleted from the hypervisor certificate store.

If an alert indicating a failed authentication associated with the unconfirmed VM is received or otherwise detected, one or more termination operations are performed to prevent the unconfirmed VM from running under the hypervisor. The termination operations may include identifying a suspect key or signature and recording the suspect key or signature in a prohibited database store, such as a UEFI Secure Boot DBX variable store. A suspect key or signature may be or include any cryptographic key or signature associated with the unconfirmed VM including, as an example, a key used to sign the unconfirmed VM. In at least some instances, the suspect key is or had previously been stored in an authorized database store, such as a DB variable store, which enabled the unconfirmed VM to issue the VM launch request.

Any one or more of the VM authentication method steps may be performed by a lightweight secure operating system (LSOS) running on the information handling system. In at least some embodiments, the LSOS serves as a foundational enabling technology for multiple use cases independent of the host OS. An LSOS image, or a base portion of the LSOS, may reside on an OEM-protected nonvolatile memory express (NVMe) partition and may include built-in connectivity and containerization supporting OEM-specific hypervisor calls for platform and peripheral management and an OEM cloud Control plane for deployment, configuration, and service. With respect to disclosed VM authentication methods, the LSOS may natively support an OEM communication channel for connecting an OEM information handling system with an OEM cloud.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
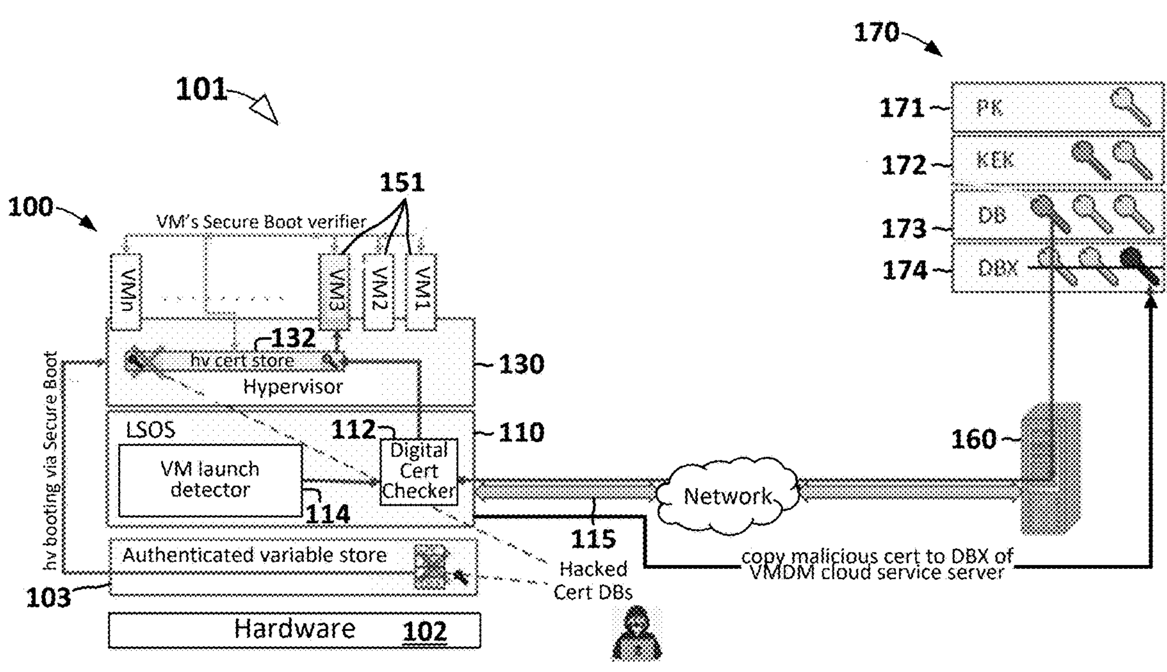
FIG. 1 illustrates a secure VM deployment framework including a hypervisor enabled by an LSOS.
Figure 2:
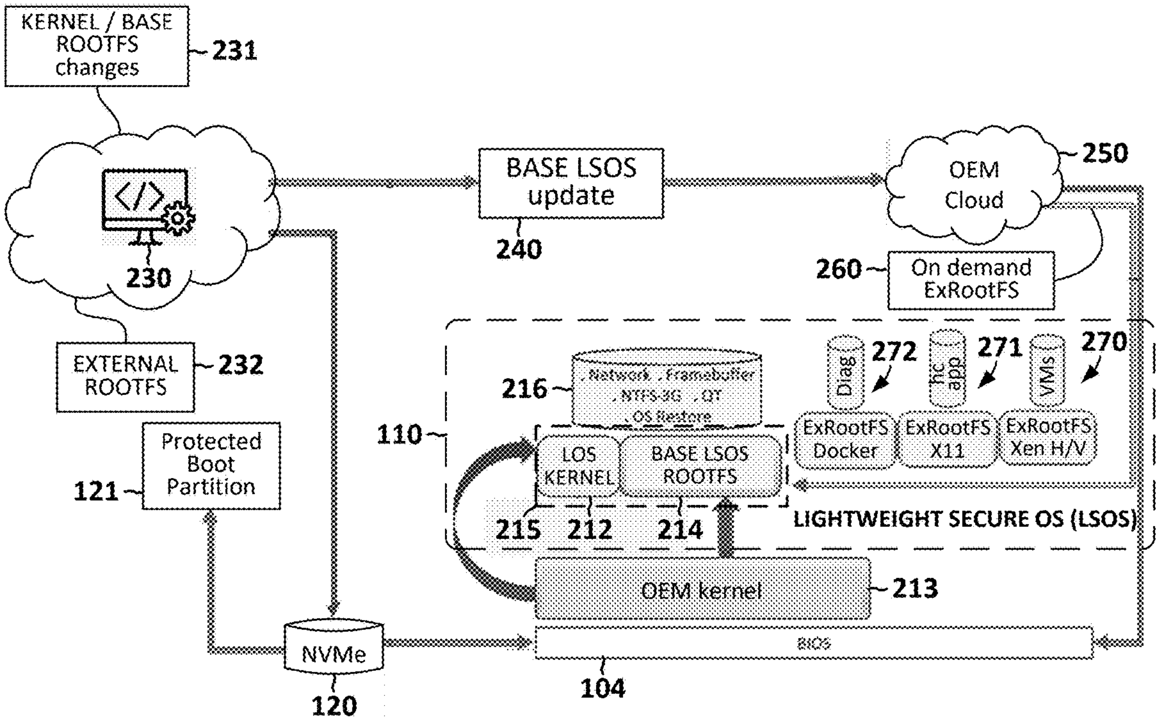
FIG. 2 illustrates an exemplary LSOS.

Exemplary embodiments and their advantages are best understood by reference to FIGS. 1-2, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to FIG. 1, a platform 101 for secure VM deployment is shown. The platform 101 of FIG. 1 includes an information handling system 100 with a hypervisor 130 running or capable of running one or more VMs 151. The hypervisor 130 of FIG. 1 is enabled by a lightweight, secure operating system (LSOS) 110, which is depicted in more detail in FIG. 2 and described in the accompanying text. In at least some embodiments, LSOS 110 is silicon-agnostic with respect to the underlying hardware 102 and, accordingly, information handling system 100 may feature any of a variety of heterogeneous silicon-IP platforms, e.g., Intel, AMD, Arm, etc. The depicted information handling system 100 is a UEFI-compliant system with UEFI Secure Boot features including an authenticated variable store 103.

LSOS 110, which is depicted in FIG. 1 securely coupled to a VM deployment/verification (VMDM) cloud service server 160 via secure connection 115, is provisioned with secure VM deployment resources including a digital certificate checker (DCC) 112 and a VM launch detector 114. The VMDM cloud service server 160 depicted in FIG. 1 includes an authenticated variable store 170 including the standard Secure Boot variables for platform key (PK) 171, key exchange key (KEK) (172), database (DB) 173, and DBX 174.

Generally, any new and authorized VM will be signed by a certificate stored in DB 173. In at least some embodiments, this certificate will itself be signed by a KEK 172. The VM launch detector 114 in LSOS 110 is configured to detect each new VM launch and trigger DCC 112. DCC 112 may request the applicable certificate from VMDM cloud service server 160 for verification. Upon receipt, the certificate may be stored to a digital certificate store 132 of hypervisor 130 before DCC 112 performs the verification. If and only if the certificate is successfully verified by DCC 112, the new VM is allowed to launch.

After the verification process completes, the certificate received from VMDM cloud service server 160 may be deleted from digital certificate store 132. Certificate ownership can be managed by an administrator or a LAB/Network admin/owner depending on the company policy. If verification fails, the certificate used to authenticate the VM is invalid and was most likely maliciously injected onto the local DB (not explicitly depicted in FIG. 1) within authenticated variable store 103. To render the invalid certificate harmless, the certificate is immediately copied to DBX 174 of VMDM cloud server 160.

Turning now to FIG. 2, the LSOS 110 of FIG. 1 is illustrated in additional detail. The LSOS 110 depicted in FIG. 2 comprises a lightweight (<100 MB), secure operating system suitable for enabling a variety of functions or use cases, independent of the host OS and agnostic with respect to the underlying silicon. LSOS 110 may feature one or more OEM-specific features supporting, as examples, OEM-specific hyper-calls for platform and peripheral management, an OEM cloud control plain for deployment, configuration, and service, and an independent communication channel for OEM offerings to connect OEM hardware with an OEM cloud.

The LSOS 110 depicted in FIG. 2 includes a base LSOS 215, including a kernel 212 and a base LSOS rootfs 214, retrieved from a secure partition 121 in NVMe 120 by BIOS 104, and one or more external rootfs instances available on-demand for enabling specific functionality. The base LSOS 215 in FIG. 2 may include at least some OEM-specific features of a custom OEM kernel 213. Base LSOS 215 may enable various utility applications 216 including, in the illustrated example, graphical display utilities such as Linux framebuffer, file system drivers such as NTFS-3g, etc.

The exemplary external rootfs instances depicted in FIG. 2 include an external rootfs 270 enabling a Xen hypervisor for providing VM functionality, an X11 rootfs 271 for a hybrid client application 271, and an external rootfs 272 enabling a diagnostic application. The illustrated external rootfs instances and other embodiments may include or support more, fewer, and/or different external rootfs examples.

As depicted in FIG. 2, a software development/management platform 230, e.g., Jenkins, delivers kernel and base rootfs changes/updates 231 as base LSOS updates 240 via an OEM cloud 250. The illustrated platform 230 also receives uploads of external rootfs instances 232 and delivers them as on-demand external rootfs 260 via OEM cloud 250.

Figure 3:
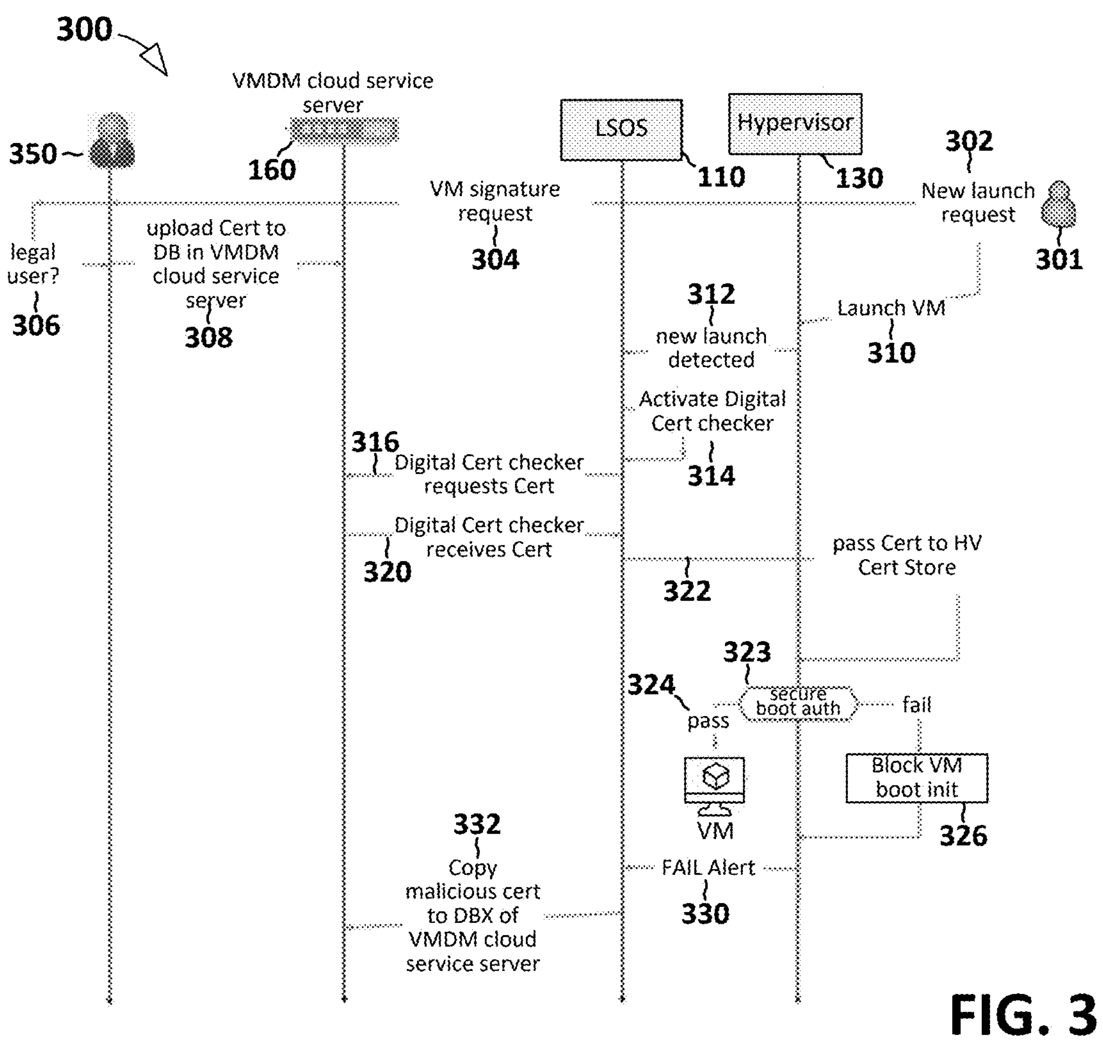
FIG. 3 illustrates a sequence diagram for a secure VM deployment method.

Referring now to FIG. 3, a sequence diagram illustrates an exemplary secure VM deployment method 300. The method 300 of FIG. 3 begins when a user 301 generates or otherwise issues or sends (step 302) a new launch request, i.e., a request to launch a new VM. For purposes of this disclosure, this new VM may be referred to as an unconfirmed VM until the VM is verified as described herein.

As depicted in FIG. 3, the new launch request may trigger or may be accompanied by a VM signature request 304 sent to an IT administrator 350. Upon receiving VM signature request 304, the IT administrator 350, may then determine (step 306) whether user 301 is an authorized user, i.e., a user authorized to create new VMs. If the user 301 is confirmed as an authorized user, IT administrator 350 may then upload (step 308) the VM signing (VMS) certificate, i.e., the digital certificate used to sign the VM binary, to the DB 171 of VMDM cloud service server 160.

Hypervisor 130 receives (step 310) the new launch request and informs (step 312) LSOS 110. The VM launch detector 114 in LSOS 110 detects the new launch request and activates (step 314) the DCC 112 of LSOS 110. DCC 112 requests (step 316) the applicable certificate from VMDM cloud service server 160. VMDM cloud service server 160 then sends (step 320) the certificate to DCC 112, which forwards (step 322) the certificate to the certificate store 132 of hypervisor 130. Hypervisor 130 then responds by executing a Secure Boot authentication (step 323).

If authentication passes, the VM is allowed to launch (step 324). If authentication fails, one or more termination operations are performed by LSOS 110 and/or hypervisor 130. The hypervisor 130 blocks (step 326) the VM from launching and alerts (step 330) LSOS 110. LSOS 110 responds to the alert by copying (step 332) the suspect certificate to DBX 174 in VMDM cloud service server 160, thereby rendering the suspect certificate harmless.

In this manner, systems and methods disclosed herein detect and prevent the addition and/or launching of unauthorized VMs with remote secure boot authentication in which VM certificates may be stored to a DB store of a VMDM cloud service server in secure communication with an LSOS that underlies and enables the platform hypervisor. The LSOS may be configured with secure VM deploy logic to fetch VM certificates whenever required. Tenant-based VM infrastructures can be accommodated by signing the VM certificate with the KEK of the same tenant. An OEM certificate checker in the hypervisor will fetch the certificate and pass it on to the hypervisor for verification.

In at least some embodiments, the certificate store 132 and authenticated variable store 103 will hold only certificates of already existing and authenticated VMs. For any new VM launch, authentication can only be obtained via the VMDM cloud service server. Any network restriction keys may be stored locally on a trusted platform module (TPM) or replay protected memory block (RPMB) protected NVMe Boot partition. The pluggable VM launch detect and CC modules can be extended for use with different operating systems. With the disclosed LSOS, the secure VM deployment disclosed herein can be achieved on a bare-metal system.

Figure 4:
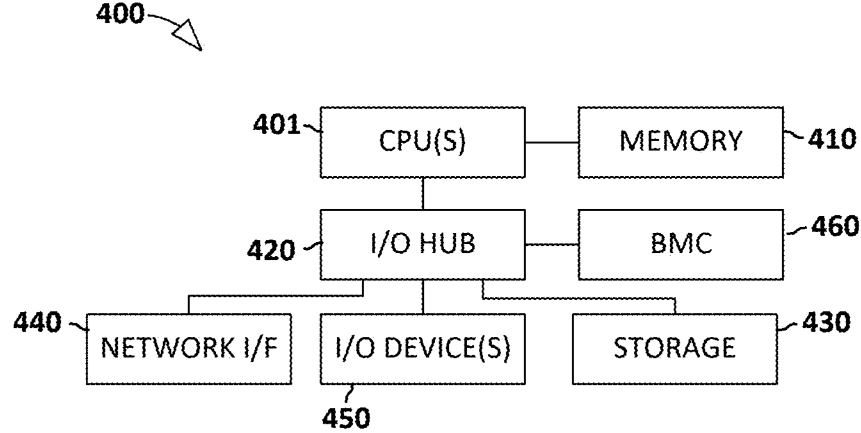
FIG. 4 illustrates an exemplary information handling system suitable for use in conjunction with systems and method illustrated in FIGS. 1-3 and described in the accompanying text.

Referring now to FIG. 4, any one or more of the elements illustrated in FIG. 1 through FIG. 2 may be implemented as or within an information handling system exemplified by the information handling system 400 illustrated in FIG. 4. The illustrated information handling system includes one or more general purpose processors or central processing units (CPUs) 401 communicatively coupled to a memory resource 410 and to an input/output hub 420 to which various I/O resources and/or components are communicatively coupled. The I/O resources explicitly depicted in FIG. 4 include a network interface 440, commonly referred to as a NIC (network interface card), storage resources 430, and additional I/O devices, components, or resources 450 including as non-limiting examples, keyboards, mice, displays, printers, speakers, microphones, etc. The illustrated information handling system 400 includes a baseboard management controller (BMC) 460 providing, among other features and services, an out-of-band management resource which may be coupled to a management server (not depicted). In at least some embodiments, BMC 460 may manage information handling system 400 even when information handling system 400 is powered off or powered to a standby state. BMC 460 may include a processor, memory, an out-of-band network interface separate from and physically isolated from an in-band network interface of information handling system 400, and/or other embedded information handling resources. In certain embodiments, BMC 460 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for authenticating virtual machine, the method comprising: detecting, by a lightweight secure operating system (LSOS) running on an information handling system, a virtual machine launch (VML) request associated with an unconfirmed virtual machine (VM) and a hypervisor, wherein the LSOS resides on an original equipment manufacturer (OEM)-protected nonvolatile memory express (NVMe) partition and is communicatively coupled to a VM deployment/verification cloud service server; activating, by the LSOS, a digital certificate checker (DCC) in response to detecting the VML request; requesting, by the DCC, a VM signing (VMS) certificate from the cloud service server, wherein the VMS certificate is stored in an authenticated variable store; receiving the VMS certificate and forwarding it to a certificate store of the hypervisor; executing, by the hypervisor, Secure Boot authentication of the unconfirmed VM using the VMS certificate; responsive to successful authentication, permitting the VM to launch and deleting the VMS certificate from the certificate store; and responsive to failed authentication, terminating the unconfirmed VM and copying, by the LSOS, a suspect certificate to a prohibited database (DBX) variable store of the cloud service server to prevent future unauthorized VM launches.

2. The method of claim 1, wherein the suspect certificate comprises a key or signature stored in an authenticated variable store of the hypervisor.

3. The method of claim 2, wherein the hypervisor comprises a Universal Extensible Firmware Interface (UEFI) compliant hypervisor.

4. The method of claim 1, further comprising, after successfully authenticating the unconfirmed VM, deleting the VMS certificate from the hypervisor certificate store.

5. The method of claim 1, wherein the LSOS performs one or more of:

detecting the VML request;

requesting the VMS certificate from the cloud service server; and forwarding the VMS certificate to the certificate store of the hypervisor.

6. The method of claim 1, further comprising, enabling, by the LSOS, an original equipment manufacturer (OEM) communication channel for connecting an OEM information handling system with an OEM cloud.

7. An information handling system, comprising: a central processing unit (CPU); and a memory, including processor executable instructions that, when executed by the CPU, cause the system to perform virtual machine authentication operations, wherein the virtual machine authentication operations include: detecting, by a lightweight secure operating system (LSOS) running on an information handling system, a virtual machine launch (VML) request associated with an unconfirmed virtual machine (VM) and a hypervisor, wherein the LSOS resides on an original equipment manufacturer (OEM)-protected nonvolatile memory express (NVMe) partition and is communicatively coupled to a VM deployment/verification cloud service server; activating, by the LSOS, a digital certificate checker (DCC) in response to detecting the VML request; requesting, by the DCC, a VM signing (VMS) certificate from the cloud service server, wherein the VMS certificate is stored in an authenticated variable store; receiving the VMS certificate and forwarding it to a certificate store of the hypervisor; executing, by the hypervisor, Secure Boot authentication of the unconfirmed VM using the VMS certificate; responsive to successful authentication, permitting the VM to launch and deleting the VMS certificate from the certificate store; and responsive to failed authentication, terminating the unconfirmed VM and copying, by the LSOS, a suspect certificate to a prohibited database (DBX) variable store of the cloud service server to prevent future unauthorized VM launches.

8. The information handling system of claim 7, wherein the suspect key or signature comprises a key or signature stored in an authorized database store of the hypervisor.

9. The information handling system of claim 8, wherein the hypervisor comprises a Universal Extensible Firmware Interface (UEFI) compliant hypervisor.

10. The information handling system of claim 7, further comprising, after successfully authenticating the unconfirmed VM, deleting the VMS certificate from the hypervisor certificate store.

11. The information handling system of claim 7, wherein the LSOS performs one or more of:

detecting the VML request;

requesting the VMS certificate from the cloud service server; and requesting the VMS certificate from a cloud server; and forwarding the VMS certificate to the certificate store of the hypervisor.

12. The information handling system of claim 7, further comprising, enabling, by the LSOS, an original equipment manufacturer (OEM) communication channel for connecting an OEM information handling system with an OEM cloud.

13. A method for authenticating virtual machines, the method comprising:

detecting, by a lightweight secure operating system (LSOS) running on an information handling system, a virtual machine launch (VML) request associated with an unconfirmed virtual machine (VM) and a hypervisor running on the information handling system, wherein the LSOS resides on an original equipment manufacturer (OEM)-protected nonvolatile memory express (NVMe) partition and is communicatively coupled to a VM deployment/verification cloud service server via a secure connection;

activating, by the LSOS, a digital certificate checker (DCC) in response to detecting the VML request;

requesting, by the DCC, a VM signing (VMS) certificate from the VM deployment/verification cloud service server, wherein the VMS certificate is stored in an authenticated variable store of the cloud service server;

receiving, from the VM deployment/verification cloud service server, the VMS certificate;

forwarding, by the DCC, the VMS certificate to a certificate store of the hypervisor;

executing, by the hypervisor, a Secure Boot authentication of the unconfirmed, VM using the VMS certificate;

responsive to successful authentication of the unconfirmed VM, permitting the unconfirmed VM to launch and deleting the VMS certificate from the certificate store of the hypervisor; and responsive to receiving an alert from the hypervisor indicating a failed authentication associated with the unconfirmed VM, performing one or more termination operations, wherein the one or more termination operations include:

terminating the unconfirmed VM to prevent the unconfirmed VM from running under the hypervisor; and copying, by the LSOS, a suspect certificate associated with the unconfirmed VM to a prohibited database (DBX) variable store of the VM deployment/verification cloud service server to prevent future unauthorized VM launches using the suspect certificate.

* * * * *